United States Patent
He et al.

(10) Patent No.: US 12,028,860 B2
(45) Date of Patent: Jul. 2, 2024

(54) TERMINAL DEVICE, NETWORK DEVICE AND METHODS THEREIN

(71) Applicant: Telefonaktiebolaget LM Ericsson (publ), Stockholm (SE)

(72) Inventors: Anqi He, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 424 days.

(21) Appl. No.: 17/423,272

(22) PCT Filed: Jan. 17, 2019

(86) PCT No.: PCT/CN2019/072190
§ 371 (c)(1),
(2) Date: Jul. 15, 2021

(87) PCT Pub. No.: WO2020/147069
PCT Pub. Date: Jul. 23, 2020

(65) Prior Publication Data
US 2022/0116966 A1    Apr. 14, 2022

(51) Int. Cl.
*H04W 72/21*    (2023.01)
*H04L 27/26*    (2006.01)
*H04W 72/1268*    (2023.01)
*H04W 72/23*    (2023.01)

(52) U.S. Cl.
CPC ......... *H04W 72/21* (2023.01); *H04L 27/2602* (2013.01); *H04W 72/1268* (2013.01); *H04W 72/23* (2023.01); *H04L 27/26035* (2021.01); *H04L 27/261* (2013.01)

(58) Field of Classification Search
CPC . H04W 72/21; H04W 72/1268; H04W 72/23; H04L 27/2602; H04L 27/26035; H04L 27/261; H04L 5/0091; H04L 5/0053; H04L 5/0016
See application file for complete search history.

(56) References Cited

U.S. PATENT DOCUMENTS

2017/0366311 A1* 12/2017 Iyer ................. H04B 7/0482
2019/0059096 A1*  2/2019 Wang ............... H04L 5/0053

FOREIGN PATENT DOCUMENTS

| CN | 103782640 A | * | 5/2014 | ........ H04W 72/1278 |
| CN | 103782640 A | | 5/2014 | |
| WO | 2017048162 A1 | | 3/2017 | |
| WO | 2018174586 A1 | | 9/2018 | |

OTHER PUBLICATIONS

International Search Report and Written opinion dated Sep. 30, 2019, for International Application No. PCT/CN2019/072190; consisting of 9-pages.
3GPP TSG RAN WG1 Meeting #89 R1-1707121; Title: Discussion on beam recovery mechanism; Agenda Item: 7.1.2.2.2; Source: ZTE; Document for: Discussion and Decision; Location and Date: Hangzhou, P.R. China, May 15-19, 2017, consisting of 8-pages.

* cited by examiner

Primary Examiner — Jianye Wu
(74) Attorney, Agent, or Firm — Sage Patent Group

(57) ABSTRACT

The present disclosure provides a method in a terminal device. The method includes: receiving from a network device a resource configuration for at least one Scheduling Request, SR, channel; and transmitting an SR to the network device in one of the at least one SR channel, for requesting for an uplink grant and for use by the network device for uplink channel measurement.

18 Claims, 9 Drawing Sheets

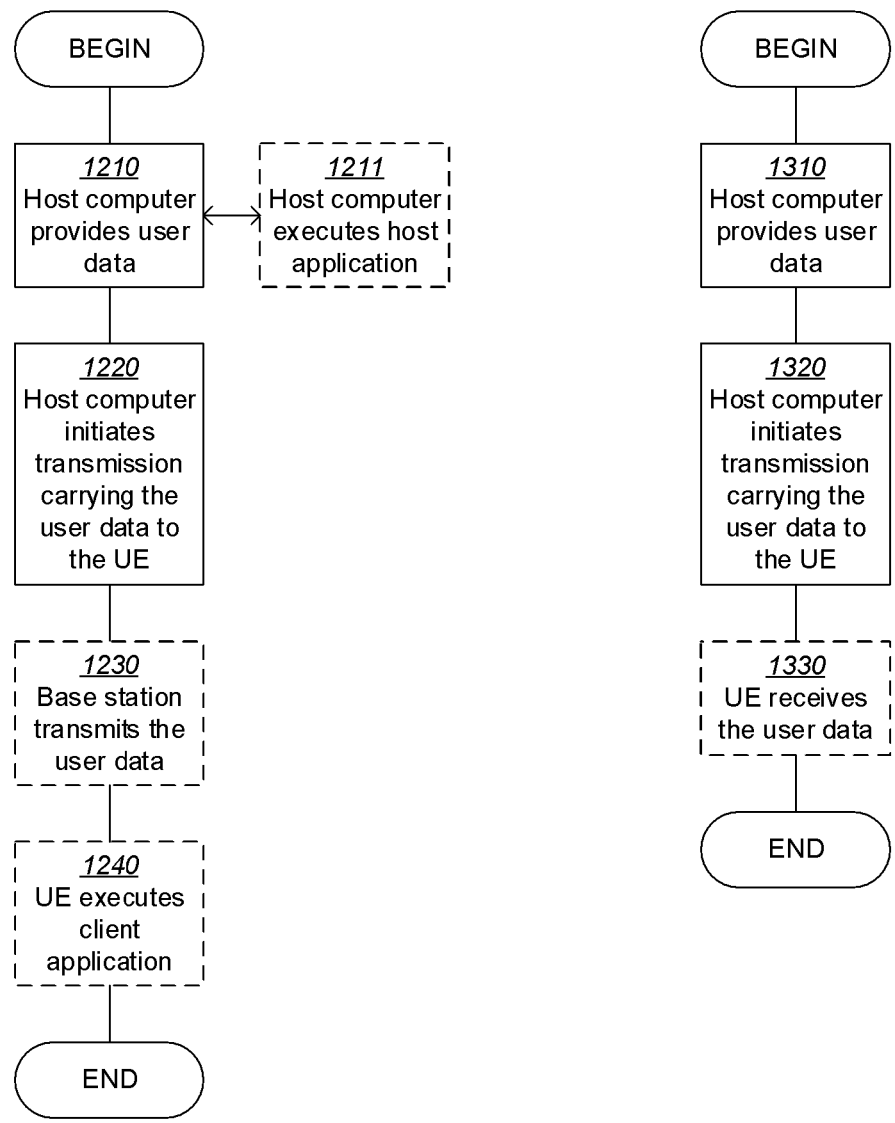

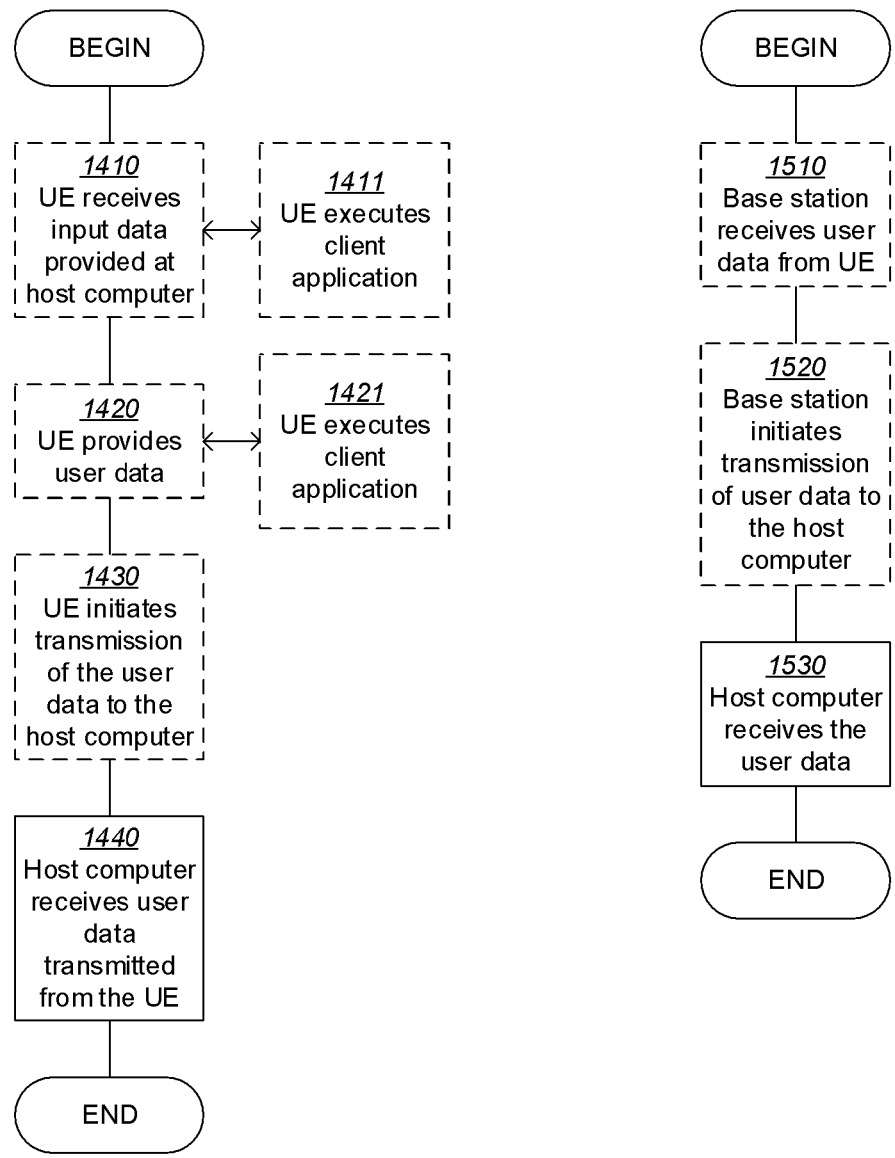

TERMINAL DEVICE, NETWORK DEVICE AND METHODS THEREIN

CROSS-REFERENCE TO RELATED APPLICATION

This application is a Submission Under 35 U.S.C. § 371 for U.S. National Stage Patent Application of International Application Number: PCT/CN2019/072190, filed Jan. 17, 2019 entitled "TERMINAL DEVICE, NETWORK DEVICE AND METHODS THEREIN," the entirety of which is incorporated herein by reference.

TECHNICAL FIELD

The present disclosure relates to wireless communication, and more particularly, to a terminal device, a network device and methods therein.

BACKGROUND

Ultra Reliable and Low-Latency Communication (URLLC) is one of the three scenarios in the 5th Generation 5G networks, with other two being enhanced Mobile Broad Band (eMMB) and Machine Type Communication (MTC). The URLLC will be applied in various scenarios such as Vehicle to Everything (V2X) communications, virtual reality and even remote surgeries. It is one of the major challenges in the 5G networks to meet the requirements of both low latency and ultra-high reliability.

A Scheduling Request (SR) is a physical layer message transmitted from a terminal device (or referred to as User Equipment or UE) to a network device (e.g., a gNB), requesting for an uplink grant. FIG. 1 shows an example of a scheduling procedure. As shown, at 101, when a UE has uplink data to transmit, it transmits an SR to a gNB over Physical Uplink Control Channel (PUCCH). The SR is typically 1-bit information. At 102, in response to the SR, the gNB transmits to the UE an uplink grant (e.g., Downlink Control Information (DCI) Format 0), including an initial (e.g., default) configuration of Modulation and Coding Scheme (MCS) and an initial (e.g., default) allocation of uplink resources, as well as a Sounding Reference Signal (SRS) request. At 103, the UE transmits the uplink data to the gNB using the MCS over the uplink (e.g., Physical Uplink Shared Channel (PUSCH)) resources, and also transmits to the gNB an SRS in response to the SRS request. At 104, the gNB measures an uplink channel from the UE based on the SRS to determine an MCS and uplink resources for the UE based on the uplink channel. At 105, the gNB transmits a configuration of the determined MCS and uplink resources to the UE. Then, the UE can perform Hybrid Automatic Repeat reQuest (HARQ) based retransmissions using the determined MCS and uplink resources.

While the HARQ-based scheme works well in conventional network scenarios for providing high spectral efficiency and high reliability, it is not as effective for URLLC or bursty traffic in eMBB due to strict latency constraints. Further, when uplink data from a UE is short and sparse in time, as in the URLLC or eMBB case, it would be difficult for a gNB to obtain an uplink channel measurement in a timely and efficient manner for occasional uplink transmissions.

SUMMARY

It is an object of the present disclosure to provide a terminal device, a network device and methods therein, capable of facilitating a more timely and efficient uplink channel measurement.

According to a first aspect of the present disclosure, a method in a terminal device is provided. The method includes: receiving from a network device a resource configuration for at least one SR channel; and transmitting an SR to the network device in one of the at least one SR channel, for requesting for an uplink grant and for use by the network device for uplink channel measurement.

In an embodiment, the one SR channel may include Resource Elements (REs) distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an Orthogonal Cover Code (OCC) applied thereto.

In an embodiment, one or more of the at least one SR channel may be associated with a Logical Channel (LCH), a Logical Channel Group (LCG) or a service. The SR may be for requesting for the uplink grant for the LCH, LCG or service and may be transmitted in one of the one or more SR channels.

In an embodiment, each of the one or more SR channels may be associated with a buffer size. The SR may be transmitted in one of the one or more SR channels that is associated with a buffer size for the LCH, LCG or service at the terminal device.

In an embodiment, the method may further include: receiving from the network device a cell specific SR configuration indicating a cell specific resource region for SR transmission. The resource configuration may indicate an index of radio resources for the at least one SR channel in the cell specific SR configuration.

In an embodiment, the resource configuration may be received via Radio Resource Control (RRC) signaling.

According to a second aspect of the present disclosure, a terminal device is provided. The terminal device includes a transceiver, a processor and a memory. The memory contains instructions executable by the processor whereby the terminal device is operative to perform the method according to the above first aspect.

According to a third aspect of the present disclosure, a computer readable storage medium is provided. The computer readable storage medium has computer program instructions stored thereon. The computer program instructions, when executed by a processor in a terminal device, cause the terminal device to perform the method according to the above first aspect.

According to a fourth aspect of the present disclosure, a method in a network device is provided. The method includes: transmitting to a terminal device a resource configuration for at least one SR channel; receiving an SR from the terminal device in one of the at least one SR channel; measuring an uplink channel from the terminal device based on the SR; determining uplink resources to be allocated in response to the SR based on the measured uplink channel; and transmitting to the terminal device an uplink grant indicating the uplink resources.

In an embodiment, the one SR channel may include REs distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an OCC applied thereto.

In an embodiment, one or more of the at least one SR channel may be associated with an LCH, an LCG or a service. The SR may be for requesting for the uplink grant for the LCH, LCG or service and is received in one of the one or more SR channels. The operation of determining may include: determining the uplink resources to be allocated for the LCH, LCG or service.

In an embodiment, each of the one or more SR channels may be associated with a buffer size. The SR may be received in one of the one or more SR channels that is associated with a buffer size for the LCH, LCG or service at the terminal device. The uplink resources may be determined based further on the buffer size.

In an embodiment, the method may further include: transmitting to the terminal device a cell specific SR configuration indicating a cell specific resource region for SR transmission. The resource configuration may indicate an index of radio resources for the at least one SR channel in the cell specific SR configuration.

In an embodiment, the resource configuration may be transmitted via RRC signaling.

According to a fifth aspect of the present disclosure, a network device is provided. The network device includes a transceiver, a processor and a memory. The memory contains instructions executable by the processor whereby the network device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a network device, cause the network device to perform the method according to the above fourth aspect.

With the embodiments of the present disclosure, a terminal device receives from a network device a resource configuration for at least one SR channel and transmits an SR to the network device in one of the at least one SR channel. The SR is both for requesting for an uplink grant and for use by the network device for uplink channel measurement. Upon receiving the SR, the network device can measure an uplink channel from the terminal device based on the SR and determine uplink resources to be allocated in response to the SR based on the measured uplink channel. In other words, the network device is enabled to measure the uplink channel based on the SR directly, without the need to request for a separate SRS from the terminal device. In this way, the uplink channel measurement can be performed in a more timely and efficient manner.

BRIEF DESCRIPTION OF THE DRAWINGS

The above and other objects, features and advantages will be more apparent from the following description of embodiments with reference to the figures, in which:

FIGS. 12 to 15 are flowcharts illustrating methods implemented in a communication system including a host computer, a base station and a user equipment.

DETAILED DESCRIPTION

Figure 1:
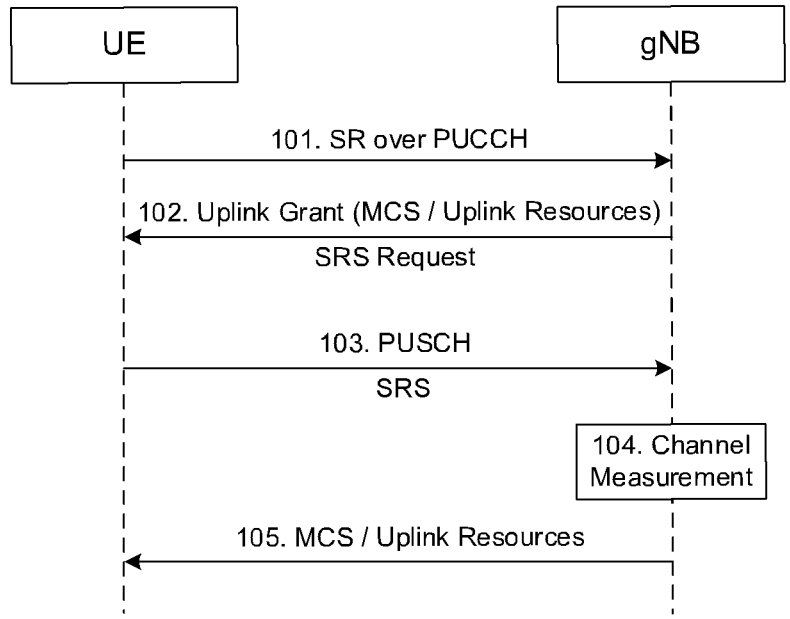
FIG. 1 is a sequence diagram showing an example of a scheduling procedure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes.

More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In order for a network device to obtain an uplink channel measurement in a timely and efficient manner, the network device may for example configure a terminal device to transmit SRSs frequently. However, this may lead to significant signaling overhead that may be unacceptable especially for infrequent, small data transmissions in the uplink. In a dynamic scheduling scenario in which a terminal device transmits SRs frequently to a network device over PUCCH to request for uplink grants, the network device can perform uplink channel measurement based on the PUCCH. However, such channel measurement would be insufficient as the PUCCH is only transmitted near the edge of the terminal device's uplink bandwidth (e.g., when the uplink bandwidth contains 24 sub-carriers indexed from #0~#23, the PUCCH may be transmitted in subcarriers #1 and #23), while PUSCH transmissions could occur elsewhere in the uplink bandwidth. This means that the PUCCH and the PUSCH may experience very different path losses and/or interferences. The MCS configuration and/or uplink resource allocation based on such insufficient channel measurement would be sub-optimal. In order to meet a requirement of a low Block Error Rate (BLER), e.g., $10^{-6}$, with the sub-optimal MCS configuration and/or uplink resource allocation, the transmission power of the PUSCH may have to be increased, e.g., by 6 dB, which may not be acceptable either.

Figure 2:
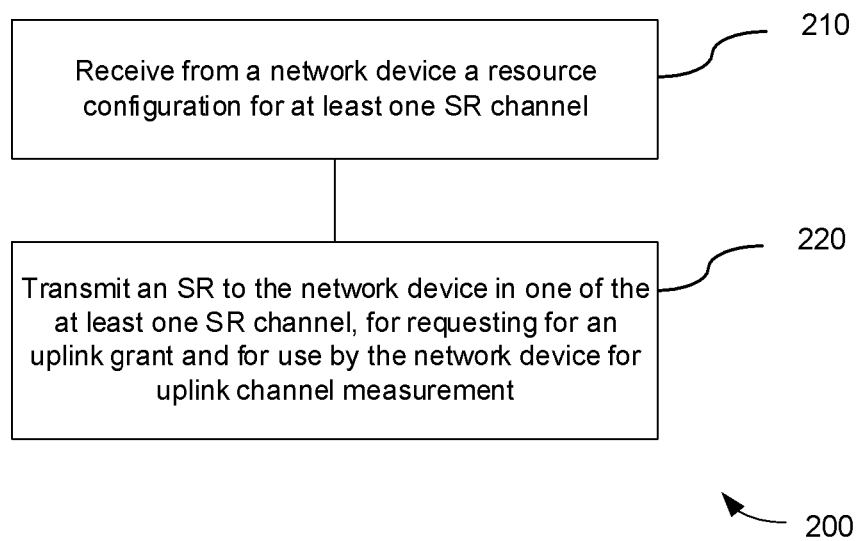
FIG. 2 is a flowchart illustrating a method in a terminal device according to an embodiment of the present disclosure.

FIG. 2 is a flowchart illustrating a method 200 according to an embodiment of the present disclosure. The method 200 can be performed by a terminal device.

At block 210, a resource configuration for at least one SR channel is received from a network device. In the context of the present disclosure, an "SR channel" refers to radio resources, e.g., time-frequency resources, for a terminal device to transmit an SR to a network device. The SR channel may be different from PUCCH as described above.

In an example, in the block 210, the resource configuration may be received via RRC signaling.

At block 220, an SR is transmitted to the network device in one of the at least one SR channel, for requesting for an uplink grant and for use by the network device for uplink channel measurement.

Figure 3:
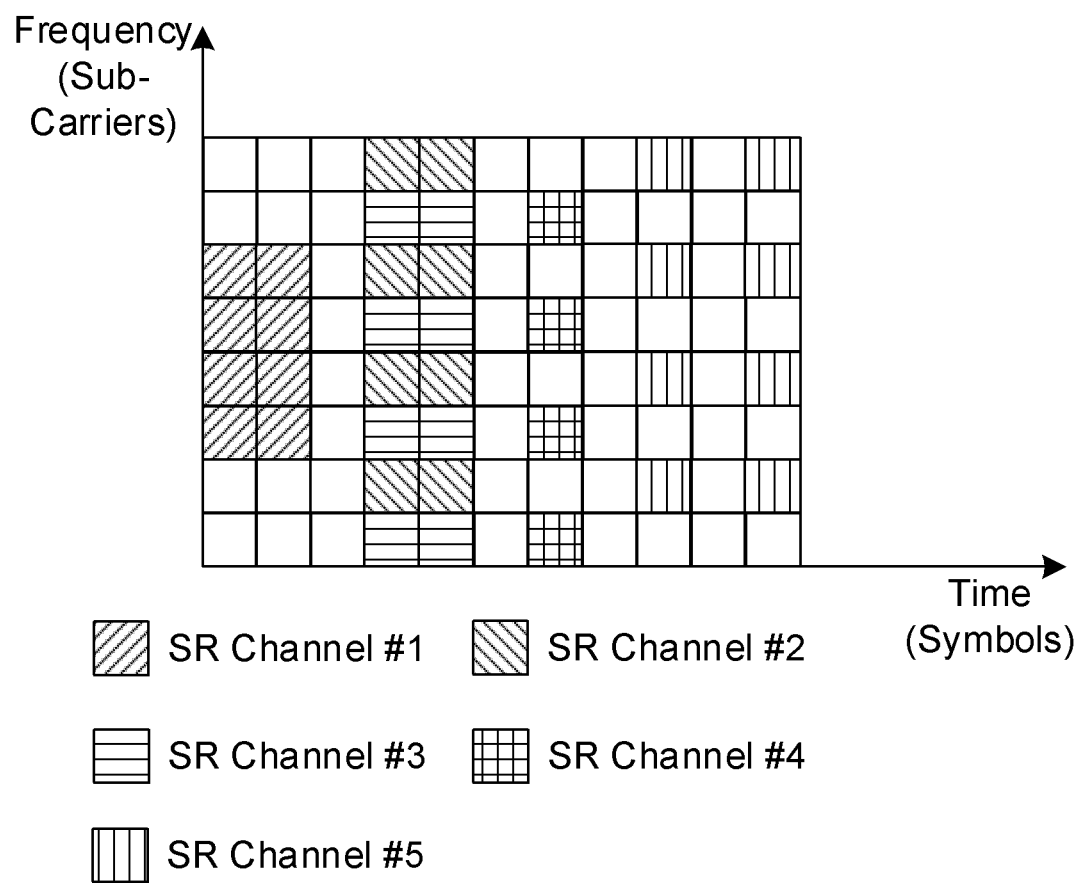
FIG. 3 is a schematic diagram showing examples of resource configurations for SR channels.

FIG. 3 is a schematic diagram showing examples of resource configurations for SR channels. Each grid in FIG. 3 represents a Resource Element (RE), i.e., one symbol in time domain and one sub-carrier in frequency domain. As shown in FIG. 3, an SR channel may include REs distributed over at least a portion of an uplink bandwidth (or Band Width Part (BWP)) allocated for the terminal device. These REs may be continuous in frequency domain, as in e.g., SR Channel #1, or discontinuous (e.g., in a comb-based pattern) in frequency domain, as in e.g., SR Channels #2~#5. Alternatively or additionally, an SR channel may include REs distributed over one symbol in time domain, as in SR Channel #4, or more than one symbol in time domain, as in SR Channels #1~#3 and #5. When an SR channel includes REs in two or more symbols, these symbols may be continuous in time domain, as in e.g., SR Channels #1~#3, or discontinuous in time domain, as in e.g., SR Channel #5.

While the SR channels are shown in FIG. 3 as non-overlapping for the purpose of illustration, different SR channels may share same REs. For example, assuming that in the block 220 the SR is transmitted in SR Channel #1, there may be SR Channel #6 occupying exactly the same REs as SR Channel #1. In this case, the SR transmitted in SR Channel #1 and an SR transmitted in SR Channel #6 may be based on orthogonal sequences. For example, they may be generated based on different ones of a set of sequences orthogonal to each other. For example, the set of orthogonal sequences may be derived from one base sequence with different cyclic shifts. Examples of such orthogonal sequences may include m-sequences, M-sequences or Zadoff-Chu sequences. Additionally or alternatively, Orthogonal Cover Codes (OCCs) can be applied to the SR transmitted in SR Channel #1 and the SR transmitted in SR Channel #6. The OCCs can be applied across the sub-carriers and/or across the symbols. In an example, the base sequence, the cyclic shifts and/or the OCCs may also be indicted by the resource configuration received in the block 210.

In an example, one or more of the at least one SR channel may be associated with a Logical Channel (LCH), a Logical Channel Group (LCG) or a service. In the block 210, the SR can request for the uplink grant for the LCH, LCG or service and can be transmitted in one of the one or more SR channels. Further, each of the one or more SR channels can be associated with a buffer size, and in the block 210, the SR is transmitted in one of the one or more SR channels that is associated with a buffer size for the LCH, LCG or service at the terminal device.

In an example, in the method 200, prior to receiving the resource configuration in the block 210, a cell specific SR configuration indicating a cell specific resource region for SR transmission can be received from the network device, e.g., via cell specific or dedicated RRC signaling. In this case, the resource configuration may indicate an index of radio resources for the at least one SR channel in the cell specific SR configuration.

Figure 4:
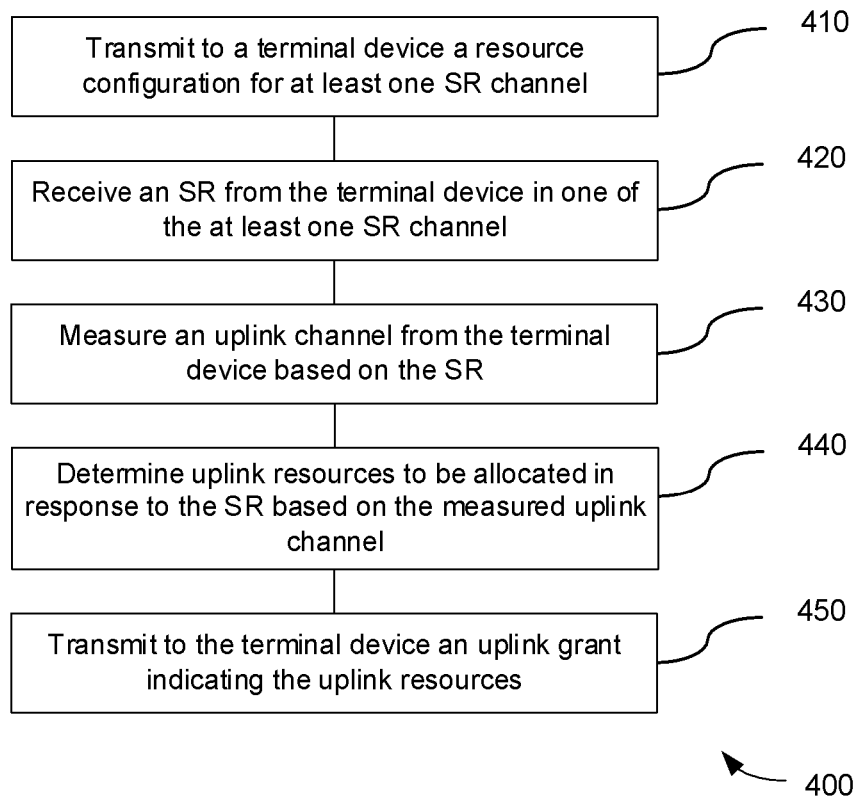
FIG. 4 is a flowchart illustrating a method in a network device according to another embodiment of the present disclosure.

FIG. 4 is a flowchart illustrating a method 400 according to another embodiment of the present disclosure. The method can be performed by a network device.

At block 410, a resource configuration for at least one SR channel is transmitted to a terminal device. In an example, the resource configuration can be transmitted via RRC signaling.

At block 420, an SR is received from the terminal device in one of the at least one SR channel.

As described above in connection with FIGS. 2 and 3, the one SR channel may include REs distributed over at least a portion of an uplink bandwidth allocated for the terminal device. For example, the one SR channel may include REs distributed in a comb-based pattern in frequency domain. Alternatively or additionally, the one SR channel may include REs distributed over one or more symbols in time domain.

As described above in connection with FIGS. 2 and 3, the SR may be based on one of a set of sequences orthogonal to each other. The one sequence may be derived from a base sequence and a cyclic shift. Alternatively or additionally, an OCC can be applied to the one SR channel.

At block 430, an uplink channel from the terminal device is measured based on the SR.

At block 440, uplink resources to be allocated in response to the SR are determined based on the measured uplink channel.

In addition to determining the uplink resources, the network device can determine link adaptation parameters for the terminal device based on the measured uplink channel. For example, based on the measured uplink channel, the network device can determine an MCS (e.g., an MCS index) and transmission power for the terminal device, and/or determine whether an uplink coverage/reliability enhancement (e.g., repeated transmissions) is to be configured for the terminal device.

At block 450, an uplink grant indicating the uplink resources is transmitted to the terminal device. The uplink grant may further indicate the MCS index, transmission power and/or uplink coverage/reliability enhancement configuration as described above.

In an example, one or more of the at least one SR channel may be associated with an LCH, an LCG or a service. The SR may request for the uplink grant for the LCH, LCG or service and may be received in one of the one or more SR channels. In the block 440, the uplink resources to be allocated for the LCH, LCG or service are determined.

In an embodiment, each of the one or more SR channels may be associated with a buffer size. The SR may be received in one of the one or more SR channels that is associated with a buffer size for the LCH, LCG or service at the terminal device. In the block 440, the uplink resources may be determined based further on the buffer size. For example, the uplink resources can be determined such that data of the buffer size can be transmitted within a predetermined time length.

In an embodiment, in the method 400, prior to transmitting the resource configuration in the block 410, a cell specific SR configuration indicating a cell specific resource region for SR transmission can be transmitted to the terminal device. The resource configuration may indicate an index of radio resources for the at least one SR channel in the cell specific SR configuration.

Figure 5:
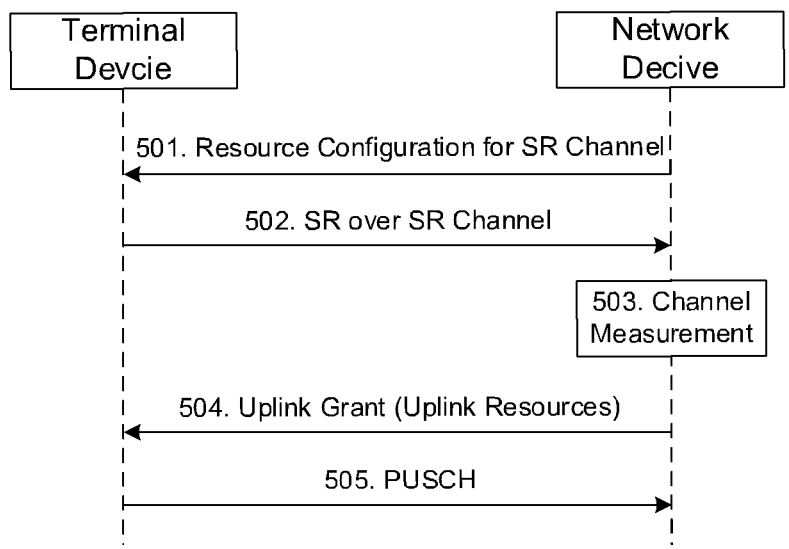
FIG. 5 is a sequence diagram showing a scheduling procedure according to an embodiment of the present disclosure.

FIG. 5 is a sequence diagram showing a scheduling procedure according to an embodiment of the present disclosure. As shown in FIG. 5, at 501, a network device transmits a resource configuration for at least one SR channel to a terminal device. At 502, the terminal device transmits an SR to the network device in one of the at least one SR channel. At 503, the network device measures an uplink channel from the terminal device based on the SR and determines uplink resources to be allocated in response to the SR (and possibly an MCS index, transmission power and/or uplink coverage/reliability enhancement configuration) based on the measured uplink channel. At 504, the network device transmits to the terminal device an uplink grant indicating the uplink resources (and possibly the MCS index, transmission power and/or uplink coverage/reliability enhancement configuration). At 505, the terminal device transmits uplink data over the uplink (PUSCH) resources.

Figure 6:
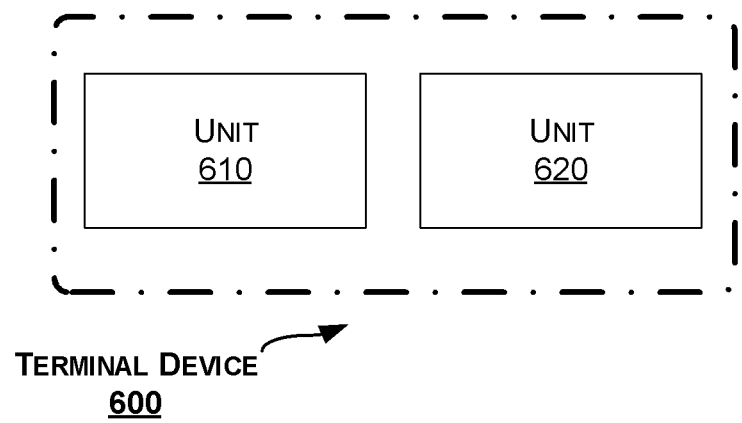
FIG. 6 is a block diagram of a terminal node according to an embodiment of the present disclosure.

Correspondingly to the method 200 as described above, a terminal device is provided. FIG. 6 is a block diagram of a terminal device 600 according to an embodiment of the present disclosure.

As shown in FIG. 6, the terminal device 600 includes a receiving unit 610 configured to receive from a network device a resource configuration for at least one SR channel. The terminal device 600 further includes a transmitting unit 620 configured to transmit an SR to the network device in one of the at least one SR channel, for requesting for an uplink grant and for use by the network device for uplink channel measurement.

In an embodiment, the one SR channel may include REs distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an Orthogonal Cover Code (OCC) applied thereto.

In an embodiment, one or more of the at least one SR channel may be associated with a Logical Channel (LCH), a Logical Channel Group (LCG) or a service. The SR may be for requesting for the uplink grant for the LCH, LCG or service and may be transmitted in one of the one or more SR channels.

In an embodiment, each of the one or more SR channels may be associated with a buffer size. The SR may be transmitted in one of the one or more SR channels that is associated with a buffer size for the LCH, LCG or service at the terminal device.

In an embodiment, the receiving unit 610 can be further configured to receive from the network device a cell specific SR configuration indicating a cell specific resource region for SR transmission. The resource configuration may indicate an index of radio resources for the at least one SR channel in the cell specific SR configuration.

In an embodiment, the resource configuration may be received via RRC signaling.

The units 610 and 620 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 7:
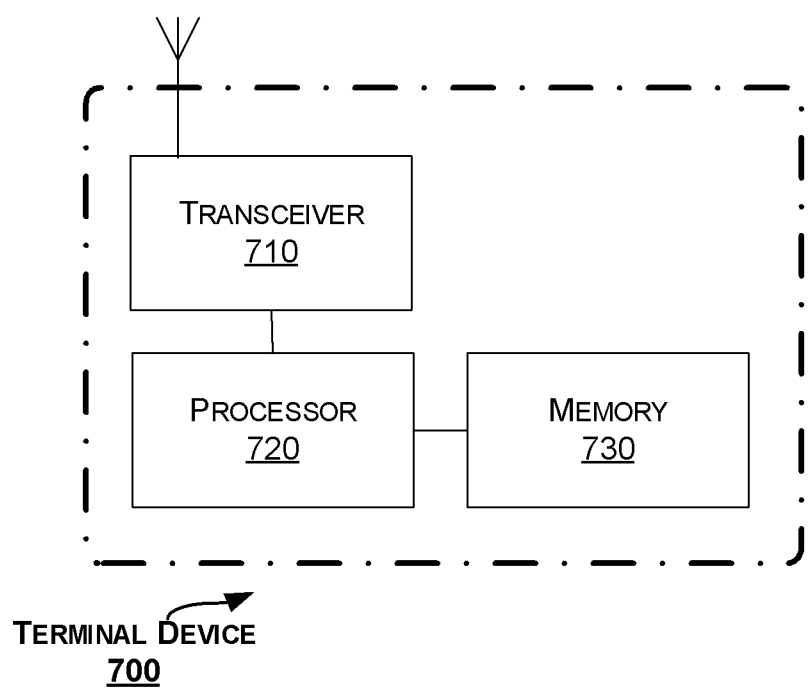
FIG. 7 is a block diagram of a terminal node according to another embodiment of the present disclosure.

FIG. 7 is a block diagram of a terminal device 700 according to another embodiment of the present disclosure.

The terminal device 700 includes a transceiver 710, a processor 720 and a memory 730. The memory 730 contains instructions executable by the processor 720 whereby the terminal device 700 is operative to perform the actions, e.g., of the procedure described earlier in conjunction with FIG. 2. Particularly, the memory 730 contains instructions executable by the processor 720 whereby the terminal device 700 is operative to: receive from a network device a resource configuration for at least one SR channel; and transmit an SR to the network device in one of the at least one SR channel, for requesting for an uplink grant and for use by the network device for uplink channel measurement.

In an embodiment, the one SR channel may include Resource Elements (REs) distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an Orthogonal Cover Code (OCC) applied thereto.

In an embodiment, one or more of the at least one SR channel may be associated with a Logical Channel (LCH), a Logical Channel Group (LCG) or a service. The SR may be for requesting for the uplink grant for the LCH, LCG or service and may be transmitted in one of the one or more SR channels.

In an embodiment, each of the one or more SR channels may be associated with a buffer size. The SR may be transmitted in one of the one or more SR channels that is associated with a buffer size for the LCH, LCG or service at the terminal device.

In an embodiment, the memory 730 may further contain instructions executable by the processor 720 whereby the terminal device 700 is operative to: receive from the network device a cell specific SR configuration indicating a cell specific resource region for SR transmission. The resource configuration may indicate an index of radio resources for the at least one SR channel in the cell specific SR configuration.

In an embodiment, the resource configuration may be received via RRC signaling.

Figure 8:
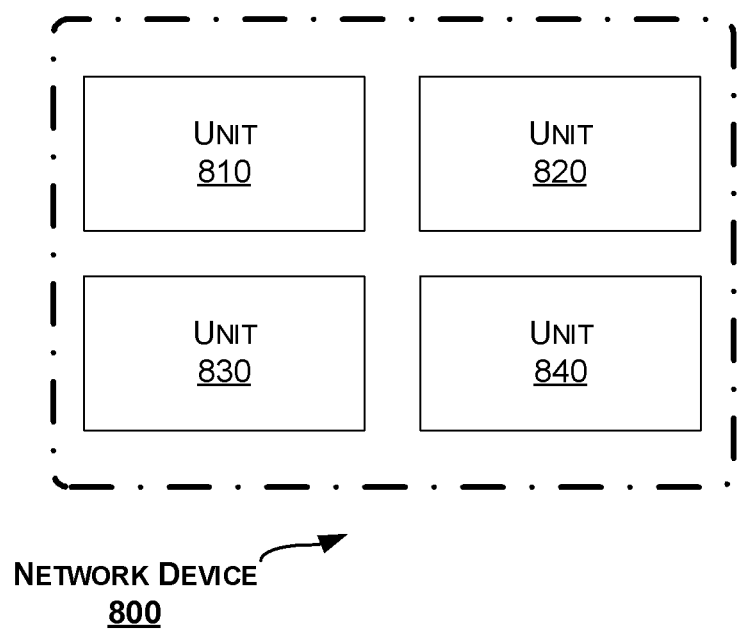
FIG. 8 is a block diagram of a network node according to another embodiment of the present disclosure.

Correspondingly to the method 400 as described above, a network device is provided. FIG. 8 is a block diagram of a network device 800 according to an embodiment of the present disclosure.

As shown in FIG. 8, the network device 800 includes a transmitting unit 810 configured to transmit to a terminal device a resource configuration for at least one SR channel. The network device 800 further includes a receiving unit 820 configured to receive an SR from the terminal device in one of the at least one SR channel. The network device 800 further includes a measuring unit 830 configured to measure an uplink channel from the terminal device based on the SR. The network device 800 further includes a determining unit 840 configured to determine uplink resources to be allocated in response to the SR based on the measured uplink channel.

The transmitting unit 810 is further configured to transmit to the terminal device an uplink grant indicating the uplink resources.

In an embodiment, the one SR channel may include REs distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an OCC applied thereto.

In an embodiment, one or more of the at least one SR channel may be associated with an LCH, an LCG or a service. The SR may be for requesting for the uplink grant for the LCH, LCG or service and is received in one of the one or more SR channels. The operation of determining may include: determining the uplink resources to be allocated for the LCH, LCG or service.

In an embodiment, each of the one or more SR channels may be associated with a buffer size. The SR may be received in one of the one or more SR channels that is associated with a buffer size for the LCH, LCG or service at the terminal device. The uplink resources may be determined based further on the buffer size.

In an embodiment, the transmitting unit 810 is further configured to transmit to the terminal device a cell specific SR configuration indicating a cell specific resource region for SR transmission. The resource configuration may indicate an index of radio resources for the at least one SR channel in the cell specific SR configuration.

In an embodiment, the resource configuration may be transmitted via RRC signaling.

The units 810-840 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 9:
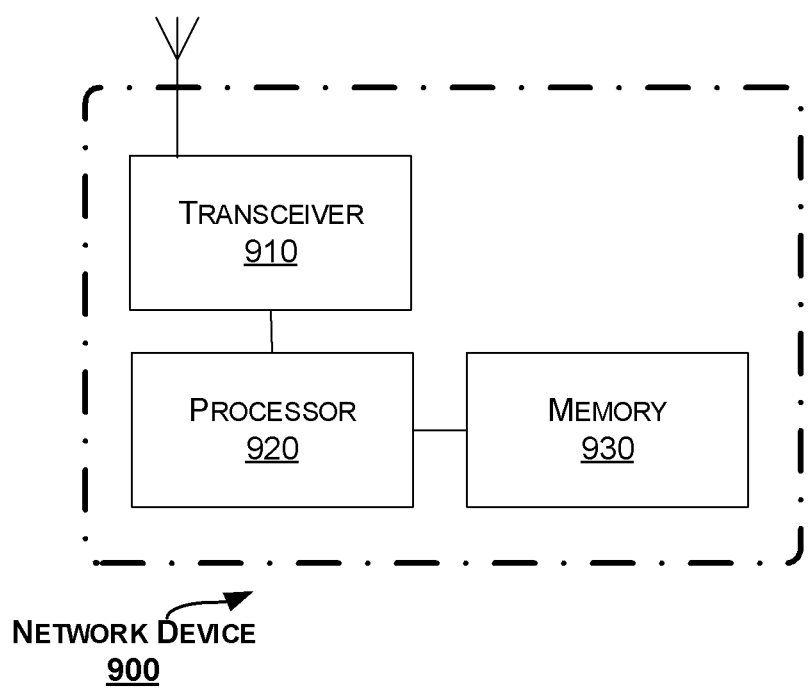
FIG. 9 is a block diagram of a network node according to another embodiment of the present disclosure.

FIG. 9 is a block diagram of a network device 900 according to another embodiment of the present disclosure.

The network device 900 includes a transceiver 910, a processor 920 and a memory 930. The memory 930 contains instructions executable by the processor 920 whereby the network device 900 is operative to perform the actions, e.g., of the procedure described earlier in conjunction with FIG. 4. Particularly, the memory 930 contains instructions executable by the processor 920 whereby the network device 900 is operative to transmit to a terminal device a resource configuration for at least one SR channel; receive an SR from the terminal device in one of the at least one SR channel; measure an uplink channel from the terminal device based on the SR; determine uplink resources to be allocated in response to the SR based on the measured uplink channel; and transmit to the terminal device an uplink grant indicating the uplink resources.

In an embodiment, the one SR channel may include REs distributed over at least a portion of an uplink bandwidth allocated for the terminal device.

In an embodiment, the one SR channel may include REs distributed in a comb-based pattern in frequency domain.

In an embodiment, the one SR channel may include REs distributed over one or more symbols in time domain.

In an embodiment, the SR may be based on one of a set of sequences orthogonal to each other.

In an embodiment, the one sequence may be derived from a base sequence and a cyclic shift.

In an embodiment, the one SR channel may have an OCC applied thereto.

In an embodiment, one or more of the at least one SR channel may be associated with an LCH, an LCG or a service. The SR may be for requesting for the uplink grant for the LCH, LCG or service and is received in one of the one or more SR channels. The operation of determining may include: determining the uplink resources to be allocated for the LCH, LCG or service.

In an embodiment, each of the one or more SR channels may be associated with a buffer size. The SR may be received in one of the one or more SR channels that is associated with a buffer size for the LCH, LCG or service at the terminal device. The uplink resources may be determined based further on the buffer size.

In an embodiment, the memory 930 may further contain instructions executable by the processor 920 whereby the network device 900 is operative to transmit to the terminal device a cell specific SR configuration indicating a cell specific resource region for SR transmission. The resource configuration may indicate an index of radio resources for the at least one SR channel in the cell specific SR configuration.

In an embodiment, the resource configuration may be transmitted via RRC signaling.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 720 causes the terminal device 700 to perform the actions, e.g., of the procedure described earlier in conjunction with FIG. 2; or code/computer readable instructions, which when executed by the processor 920 causes the network device 900 to perform the actions, e.g., of the procedure described earlier in conjunction with FIG. 4.

The computer program product may be configured as a computer program code structured in computer program modules. The computer program modules could essentially perform the actions of the flow illustrated in FIG. 2 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 10:
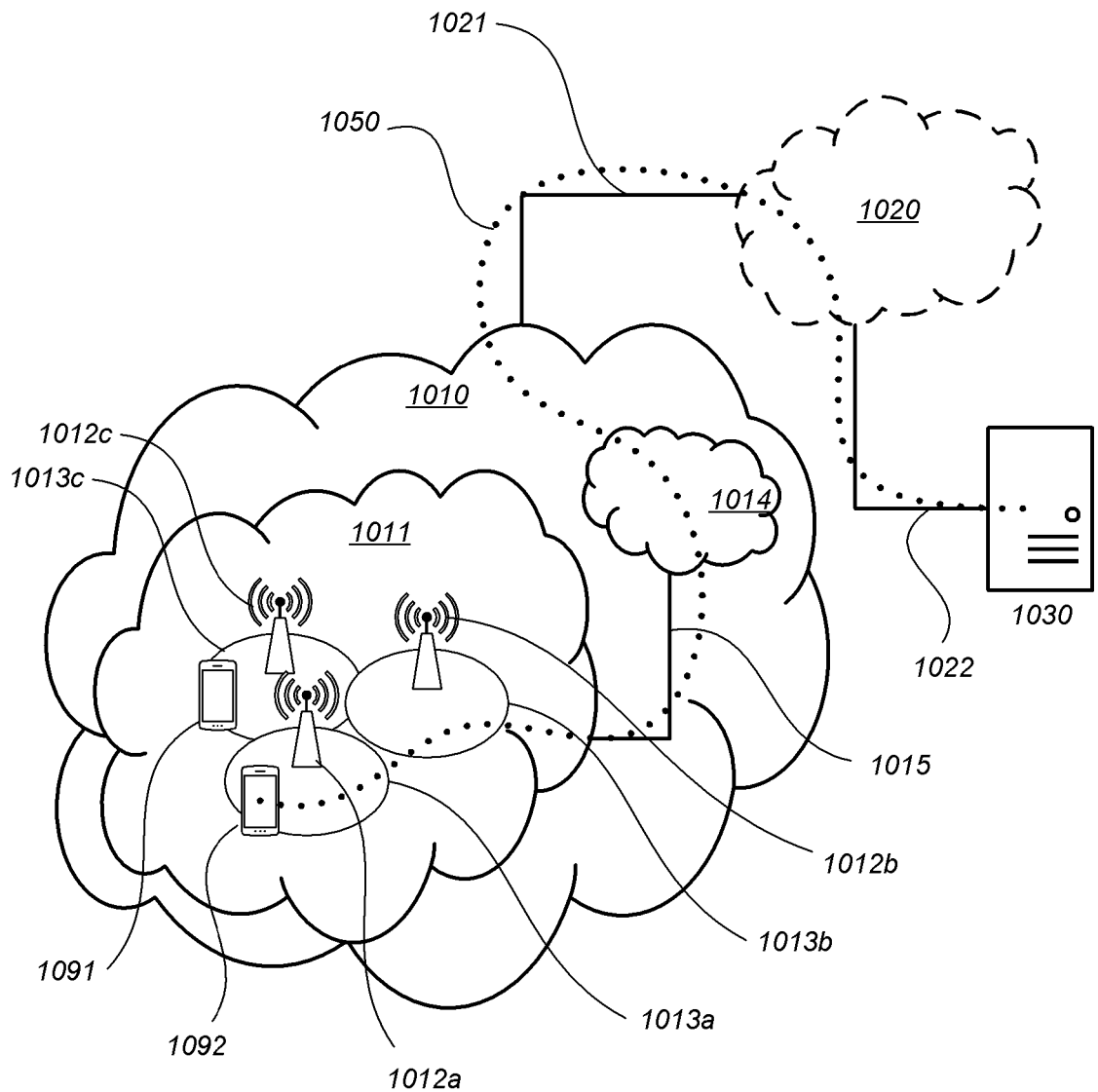
FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
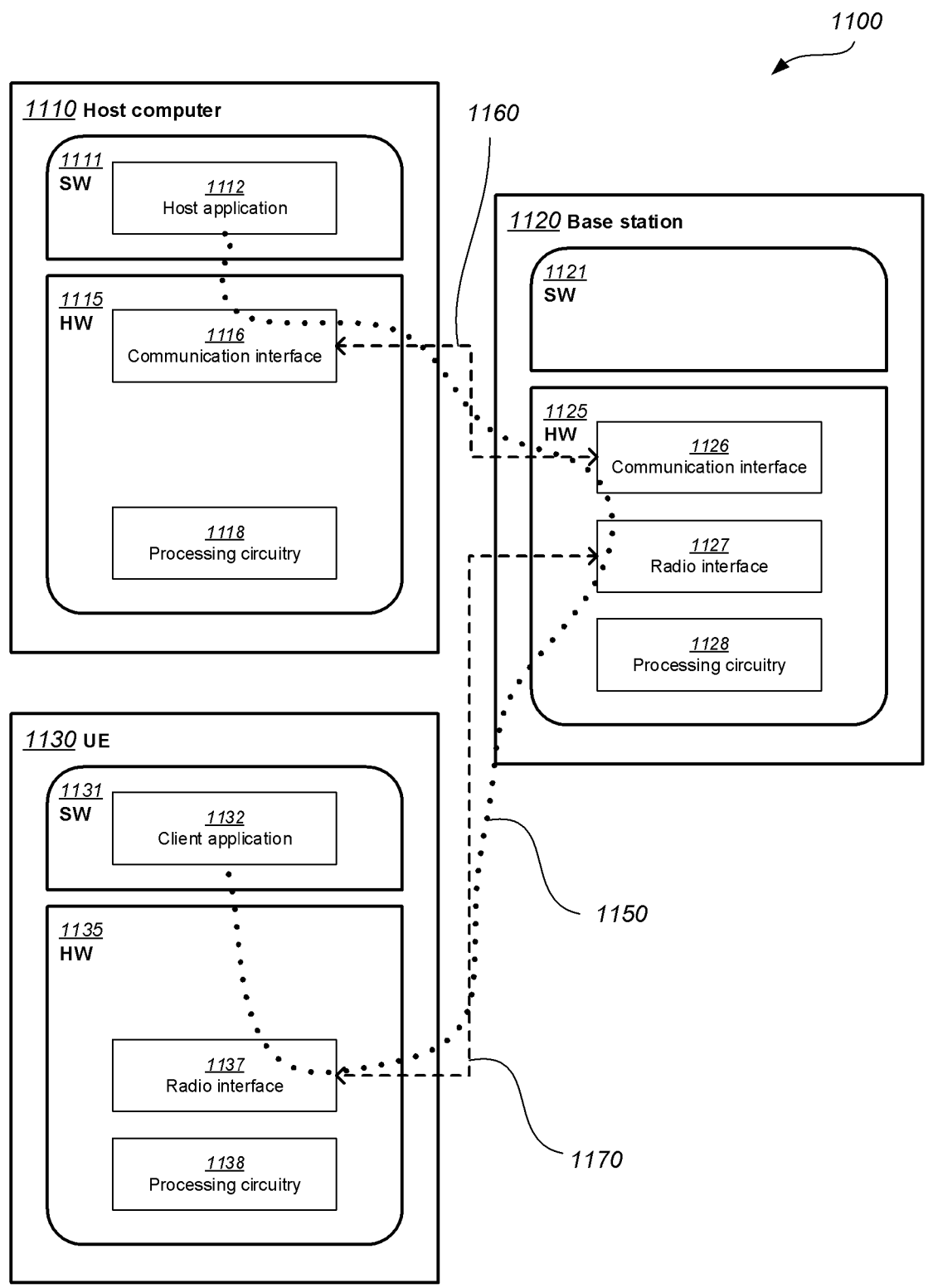
FIG. 11 is a generalized block diagram of a host computer communicating via a base station with a user equipment over a partially wireless connection.

It is noted that the host computer 1110, base station 1120 and UE 1130 illustrated in FIG. 11 may be identical to the host computer 1030, one of the base stations 1012*a*, 1012*b*, 1012*c* and one of the UEs 1091, 1092 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1111 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device, the method comprising:
receiving from a network device a resource configuration for at least one Scheduling Request (SR) channel; and
transmitting an SR to the network device in one of the at least one SR channel requesting an uplink grant and for use by the network device for uplink channel measurement, wherein the resource configurations for the one SR channel comprises Resource Elements (REs) distributed over one or more symbols in a time domain.

2. The method of claim 1, wherein the one SR channel comprises the REs distributed over at least a portion of an uplink bandwidth allocated for the terminal device.

3. The method of claim 1, wherein the SR is based on one of a set of sequences orthogonal to each other.

4. The method of claim 3, wherein the one sequence is derived from a base sequence and a cyclic shift.

5. The method of claim 1, wherein the one SR channel has an Orthogonal Cover Code (OCC) applied thereto.

6. The method of claim 1, wherein one or more of the at least one SR channel is associated with one of a Logical Channel (LCH), a Logical Channel Group (LCG), and a service, and wherein the SR is for requesting for the uplink grant for the one of the LCH, LCG, and service, and is transmitted in one of the one or more SR channels.

7. The method of claim 6, wherein each of the one or more SR channels is associated with a buffer size, and wherein the SR is transmitted in one of the one or more SR channels that is associated with one of a buffer size for the LCH, LCG, and service at the terminal device.

8. The method of claim 1, further comprising:
receiving from the network device a cell specific SR configuration indicating a cell specific resource region for SR transmission; and
wherein the resource configuration indicates an index of radio resources for the at least one SR channel in the cell specific SR configuration.

9. A terminal device, comprising a transceiver, a processor and a memory, the memory comprising instructions executable by the processor to configure the terminal device to:
receive from a network device a resource configuration for at least one Scheduling Request (SR) channel; and
transmit an SR to the network device in one of the at least one SR channel requesting an uplink grant and for use by the network device for uplink channel measurement, wherein the resource configurations for the one SR channel comprises Resource Elements (REs) distributed over one or more symbols in a time domain.

10. A method in a network device, the method comprising:
transmitting to a terminal device a resource configuration for at least one Scheduling Request channel;
receiving an SR from the terminal device in one of the at least one SR channel;
measuring an uplink channel from the terminal device based on the SR;
determining uplink resources to be allocated in response to the SR based on the measured uplink channel; and
transmitting to the terminal device an uplink grant indicating the uplink resources, wherein the resource configurations for the one SR channel comprises Resource Elements (REs) distributed over one or more symbols in a time domain.

11. The method of claim 10, wherein the one SR channel comprises the REs distributed over at least a portion of an uplink bandwidth allocated for the terminal device.

12. The method of claim 10, wherein the SR is based on one of a set of sequences orthogonal to each other.

13. The method of claim 12, wherein the one sequence is derived from a base sequence and a cyclic shift.

14. The method of claim 10, wherein the one SR channel has an Orthogonal Cover Code (OCC) applied thereto.

15. The method of claim 10, wherein one or more of the at least one SR channel is associated with one of a Logical Channel (LCH), a Logical Channel Group (LCG), and a service;
the SR is for requesting for the uplink grant for the LCH, LCG, or service and is received in one of the one or more SR channels; and
the determining comprises determining the uplink resources to be allocated for the one of the LCH, LCG, and service.

16. The method of claim 15, wherein each of the one or more SR channels is associated with a buffer size;
the SR is received in one of the one or more SR channels that is associated with a buffer size for the one of the LCH, LCG, and service at the terminal device; and
the uplink resources are determined based further on the buffer size.

17. The method of claim 10, further comprising:
transmitting to the terminal device a cell specific SR configuration indicating a cell specific resource region for SR transmission; and
wherein the resource configuration indicates an index of radio resources for the at least one SR channel in the cell specific SR configuration.

18. A network device, comprising a transceiver, a processor and a memory, the memory comprising instructions executable by the processor whereby to configure the network device to:
transmit to a terminal device a resource configuration for at least one Scheduling Request (SR) channel;
receive an SR from the terminal device in one of the at least one SR channel;
measure an uplink channel from the terminal device based on the SR;
determine uplink resources to be allocated in response to the SR based on the measured uplink channel; and
transmit to the terminal device an uplink grant indicating the uplink resources, wherein the resource configurations for the one SR channel comprises Resource Elements (REs) distributed over one or more symbols in a time domain.

* * * * *